(12) United States Patent
Schwabe et al.

(10) Patent No.: US 7,030,605 B2
(45) Date of Patent: Apr. 18, 2006

(54) MEASURING GRADUATION FOR A POSITION MEASURING SYSTEM

(75) Inventors: Michael Schwabe, Bad Endorf - Hemhof (DE); Andreas Schroter, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 239 days.

(21) Appl. No.: 10/715,764

(22) Filed: Nov. 18, 2003

(65) Prior Publication Data
US 2004/0100253 A1     May 27, 2004

(30) Foreign Application Priority Data
Nov. 20, 2002   (DE) ................................ 102 54 897

(51) Int. Cl.
*G01B 7/14*     (2006.01)
(52) U.S. Cl. ............................... 324/207.24; 324/207.22
(58) Field of Classification Search ........... 324/207.24, 324/207.22
See application file for complete search history.

(56) References Cited

U.S. PATENT DOCUMENTS 4,612,502 A * 9/1986 Spies .................... 324/207.22

* cited by examiner

*Primary Examiner*—Bot Ledynh
*Assistant Examiner*—Reena Aurora
(74) *Attorney, Agent, or Firm*—Abelman, Frayne & Schwab

(57) ABSTRACT

A measuring graduation for position measuring systems has a base body formed of a permanently magnetizable material, extending in a measuring direction and having first and second sections alternatingly arranged one after another in the measuring direction and having, respectively, first and second magnetization directions, with the second sections being formed by magnetically weak regions, and with the second magnetization direction of the second sections being defined by the first magnetization direction of adjacent first sections; and the method of magnetization of the base body includes magnetizing the base body in a homogenous outer magnetic field.

25 Claims, 3 Drawing Sheets

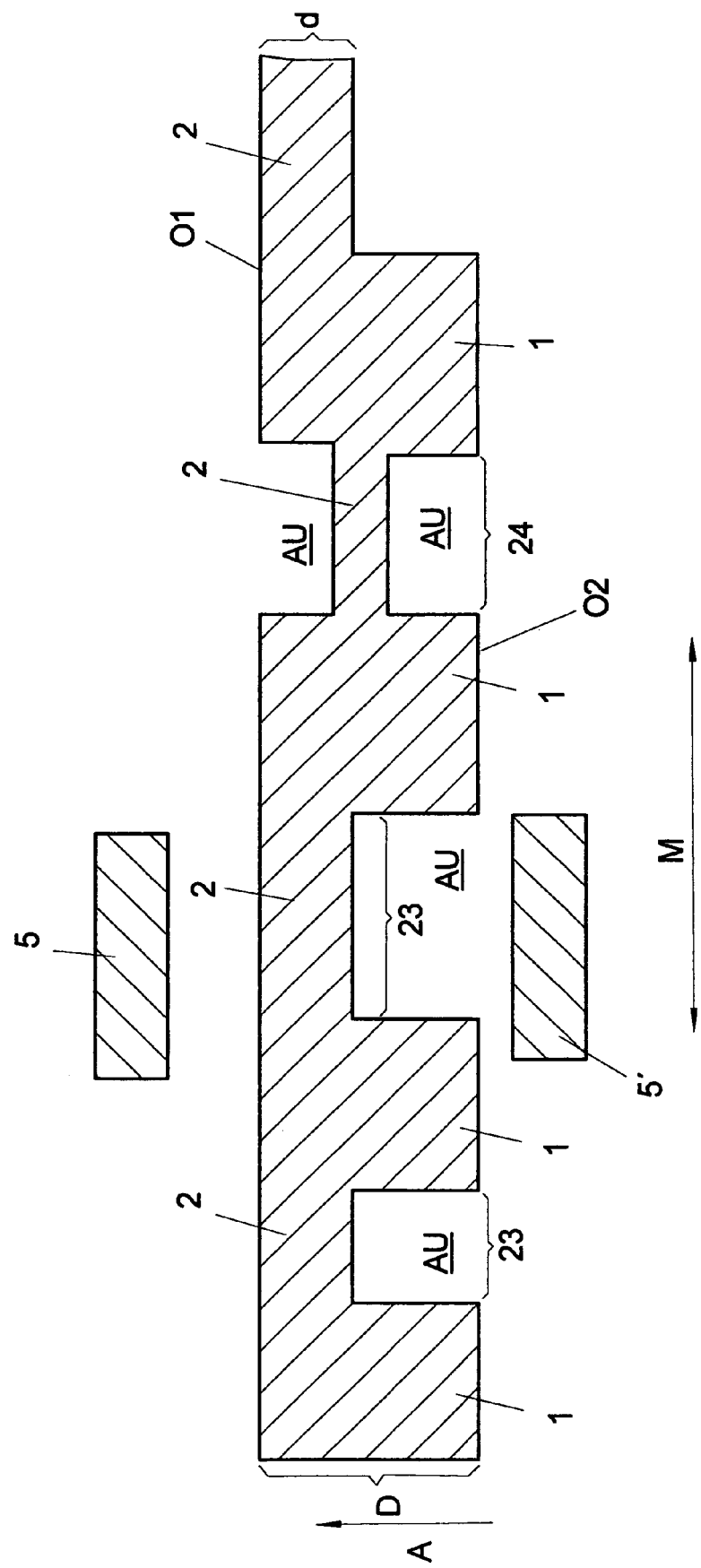

MEASURING GRADUATION FOR A POSITION MEASURING SYSTEM

BACKGROUND OF THE INVENTION

1. Field of Invention

The present invention relates to a measuring graduation for a position measuring system having a base body formed of a permanently magnetizable material, extending in a measuring direction, and having first and second sections alternatingly arranged one after another in the measuring direction and having, respectively, first and second magnetization directions, with a position information being generated by a sensor displaceable relative to the base body in the measuring direction for scanning the same. The present invention also relates to a position measuring system with the inventive measuring graduation and to a method of magnetizing the base body of the measuring graduation.

2. Description of the Prior Art

In measuring graduations of the type described above, the base body, which serves as a graduation support, is formed advantageously as a one-piece part with a predetermined magnetic structure forming a graduation standard. The magnetic structure is produced by magnetization of the base body, whereby the base body, viewed in a predetermined measuring direction, has first sections having a first magnetization direction and second sections having at least one further magnetization direction. The first and second sections are so alternatingly arranged one behind the other that a position information is generated by a sensor displaceable relative to the base body in the predetermined measuring direction. With this, on one hand, an absolute position information can be obtained when the magnetization of the base body produces a code.

With the sensor scanning the code, for each position of the sensor relative to the base body, the position of the sensor is singularly defined. On the other hand, the magnetic structure of the base body can be used for producing an incremental track which enables to easily determine the change of a position of a sensor relative to the base body.

Here, permanently magnetizable material is a magnetic material in which a location-dependent magnetization is produced by one or several outer magnetic fields and which is retained when the base body is not subjected to the action of the one or several magnetic fields. A base body formed of a permanently magnetizable material is, thus, suitable for use in position measuring systems.

A problem with a magnetic base body with a predetermined magnetic structure (location-dependent magnetization) consists in producing of a magnetic structure which would have, viewing in a measuring direction, arranged one after another sections with a different magnetization direction and which would have, respectively, a definite, predetermined magnitude necessary for a precise determination of a position. Therefore, for forming a magnetic measuring graduation often a two-part base body is used, with the two parts being magnetized independently of each other and then assembled with each other, with one part forming sections with first magnetization direction and the other part forming sections with a second magnetization direction.

An object of the present invention is a measuring graduation of the type described above which has a simple construction and which can be easily produced.

SUMMARY OF THE INVENTION

This and other objects of the present invention, which will become apparent hereinafter, are achieved by providing a measuring graduation in which the second sections are formed by magnetically weak regions, and the second magnetization direction of the second sections is defined by the first magnetization direction of adjacent first sections.

Such measuring graduations can be easily produced by magnetization of a, preferably, one-piece base body in an outer magnetic field which produces the first magnetization directions in the first sections of the base body. However, the magnetization direction of the second sections of the base body is not produced by this outer magnetic field. Rather, the magnetization direction of the second sections is defined by the magnetic reflux of the field lines produced by the magnetization of the first sections of the base body. For forming closed field lines, the magnetic flux, which is produced by a magnetic field that flows in a first direction through the first sections of the base body, flows in the weak regions in opposite directions. That is, the outer magnetic field does not directly defines the direction of magnetization of the second sections of the base body. Rather, the magnetization direction of the second sections of the base body is defined by the spatial orientation of the magnetization of the base body induced by the outer magnetic field. Thus, the direction of the magnetization in the second sections is defined by the magnetic reflux of the field lines produced as a result of magnetization of the first sections of the base body, and this direction is, in particular, opposite the direction of the outer magnetic field.

In particular it is contemplated that the second sections of the base body have their predominant portions surrounded, in a direction transverse to the second magnetization direction, by respective regions of the first sections of the base body.

According to one embodiment of the present invention, the second sections of the base body are so formed and arranged that upon the magnetization of the base body with a homogeneous outer magnetic field, the magnetization direction of the second sections of the base body is defined not by the direction of the outer magnetic field but by the direction of the magnetic reflux of the magnetization of the first sections of the base body, with the outer field determining the spatial orientation of the magnetization of the base body.

This can be achieved, e.g., by providing second sections which have a smaller coercive field strength than the first sections. This results in that after the magnetization of the base body in a homogeneous outer magnetic field, the second sections of the base body, which do not obtain a predetermined magnetization by the direction of the outer magnetic field but rather by the magnetization of the first sections of the base body, have a different (in particular opposite) direction of magnetization. In addition, if necessary, after the magnetization in a homogeneous outer magnetic field, the base body can be subjected to action of a second, weaker magnetic field having the opposite direction and which is not capable of changing the magnetization direction of the first sections of the base body but which, together with the magnetic reflux of first sections, provides for magnetization of the second section of the base body formed as magnetically weak regions.

Further, the second sections of the base body can be so formed that they have a smaller critical temperature (irregular temperature) than the magnetic first sections, which corresponds to weakening of magnetic properties. This means that the magnetization of the second sections collapses at lower temperatures than the magnetization of the first sections. This can be used for obtaining the magnetization of the second sections of the base body by heating the base body to a temperature slightly below the critical temperature (Curie-temperature in case of ferro-magnets) of the second sections. At such temperatures, the magnetization of the second section is unstable, which provides for their magnetization under the influence of the reflux of the magnetic first sections or by a weak outer magnetic field which is not sufficient for magnetization of the first sections of the base body.

The magnetically weak regions of the base body of a position measuring system, which form the second sections of the measuring standard, can in particular be defined by recesses formed in the base body. According to one of the embodiment of the present invention, the recesses form through-openings which provide for an easy penetration of the magnetic reflux of the magnetization of the first sections of the base body. On the other hand, the weak regions can be formed by regions of reduced material thickness of the base body. Under the thickness of the base body, its dimension in a direction transverse to the measuring direction, in particular, along the magnetization direction, is understood.

Because the second sections of the base body can be formed by recesses, in particular in form of through-openings, under "magnetization" of the second sections a resulting magnetic field (corresponding to the resulting magnetic flux) is understood. The word "magnetization," in this contest, should not be understood in a narrow sense as magnetization of a material. Rather, it describes a field produced in a predetermined spatial region (section of the base body).

For stabilization of the base body, the weak regions can additionally be filled with a non-magnetic filling mass or compound.

According to an advantageous embodiment of the present invention, the weak regions of the base body are symmetrically arranged and are so formed that they provide, viewing in the measuring direction, a symmetrical field distribution on both sides of the base body. This makes possible an opposite, differential scanning of the base body by sensors arranged on opposite sides of the base body. This scanning principle permits to obtain position measuring data that do not depend on relative movements of sensors, which are used as a scanning unit, relative to the graduation standard provided on the base body and in a direction transverse to the measuring direction.

According to a further advantageous embodiment of the present invention, the weak regions of the base body have, viewing in the measuring directions, a contraction in their middle regions which can have, e.g., a bone shape. Thereby, particularly steep field gradients are produced in respective transitional regions between the first and second sections of the base body. These transitional regions permit a precise determination of a position.

According to another embodiment, the weak regions continuously narrow or widen in the measuring direction and can be formed, e.g., with a shape of a tear drop. This provides for a course of magnetization in the region of the second sections of the base body in the form of a tooth saw.

In the above-described embodiments, the narrow and widening regions are formed, respectively, in a plane extending transverse to the direction of the magnetization.

A base body, in particular, a one-piece base body, which is formed by injection-molding, forms a graduation support of the inventive measuring graduation. The base body is formed, preferably, of a polyamide-bonded strontium ferrite.

For a predetermined guidance of the magnetic flux, which is produced by the magnetization of the base body, a flux guiding element can be provided on the base body and, in particular, along a longitudinal side of the base body. Advantageously, the flux guiding element is formed as a flux guiding sheet of metal containing iron and/or nickel. With a base body, only one side of which is scanned with a scanning unit, the flux guiding element, preferably, extends along the other, opposite side of the base body.

For attaching the flux guiding element to the base body, a filling mass, which fills the recesses forming the magnetically weak regions, can be used. In this case, a glue compound is used as a filling mass, e.g., an epoxyde-containing glue compound can be used as filling mass.

The inventive measuring graduation can be used as a measuring graduation in both linear measuring systems and angle measuring systems.

A position measuring system, in which the inventive measuring graduation is used, also includes at least one sensor which is displaced along the base body in the measuring direction for scanning the base body. The position measuring system can include two sensors arranged on opposite longitudinal sides of the base body.

As a scanning sensor, basically, any sensor, which is suitable for scanning a magnetic measuring graduation, can be used. As a scanning sensor, e.g., an analog or digital Hall-sensor or (Giant)-magneto resistant sensor can be used.

According to the present invention, the method of magnetizing the measuring graduation includes magnetization of the base body in a homogeneous outer magnetic field. Because of the specific shape of the magnetic base body of the inventive measuring graduation, the direction of the magnetization of the first sections of the base body, as it has already been described above, differs from the direction of the magnetization of the second sections of the base body.

According to an advantageous embodiment of the inventive method, the magnetization of the second sections of the base body is obtained exclusively with the magnetic reflux of the magnetization of the first sections of the base body. However, as it has already been discussed above, the base body can be heated (in particular to a temperature slightly below the critical temperature of the second sections of the base body) for effecting the magnetization. In addition or instead, the base body can be subjected to the action of a further magnetic field which is weaker than the homogeneous outer magnetic field and has an opposite direction.

When the base body is produced by injection-molding, the magnetization can be effected with an apparatus for producing a homogeneous magnetic field and which is integrated in the injection-molding machine.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2 a longitudinal cross-sectional view of a linear position measuring system with a magnetic measurement graduation according to the present invention which extends in a measuring direction, with sensors provided on two opposite sides of the measurement graduation for scanning the graduation;

FIG. 3b a cross-sectional view of the measurement graduation shown in FIG. 3a;

DETAILED DESCRIPTION OF THE PREFERRED EMBODIMENTS

Figure 1:
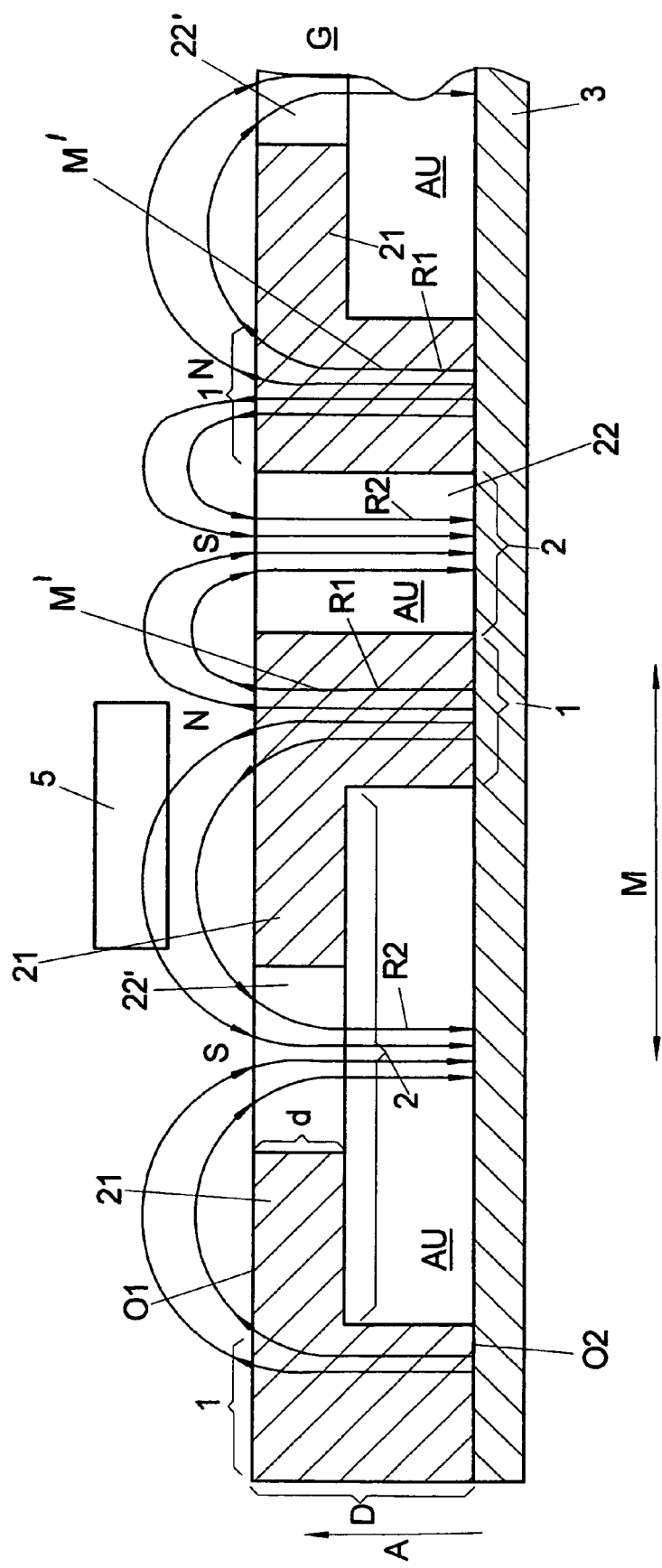
FIG. 1 a longitudinal cross-sectional view of a linear position measuring system with a magnetic measurement graduation according to the present invention which extends in a measuring direction, and a sensor for scanning the graduation.

A linear position measuring system, which is shown in FIG. 1, includes a measurement graduation which extends in a measuring direction M, and a sensor 5 for scanning the graduation. The measurement graduation is formed by a graduation support or base body G which is made of a paramagnetizable material such as, e.g., polyamide (PA)-bonded strontium ferrite. The measurement graduation is so magnetized that upon displacement of the sensor 5 along the base body G in the measuring direction M, the length of displacement of the sensor 5 relative to the measurement graduation or the base body G is determined by scanning of the measurement graduation with the sensor 5. Such linear measuring systems can be used, e.g., in machines, in particular in machine-tools, for determining a position of two, movable relative to each other, machine parts, with the measurement graduation and the sensor being secured on respective ones of the two, movable relative to each other parts.

The base body G, which is shown in FIG. 1, is formed as a one-piece structural element, in particular, by injection-molding. The base body G has first and second sections 1, 2 located one behind the other in the measuring direction M. The two sections 1 and 2 are magnetized in respective opposite directions R1, R2 with respect to an axis of anisotropy extending perpendicular to a measurement plane, in particular to the measurement direction M. With the alternative arrangement of the first sections 1 with the first magnetization direction R1 and the second sections 2 with the second magnetization direction, there formed on an upper surface 01 of the base body G, viewed in the measuring direction M, an alternating arrangement of magnetic north poles N and south poles S. The north and south poles N and S are detectable by the sensor 5 movable along the upper surface 01 in the measurement direction M, whereby the position measurement takes place. The north and south poles N and S can b, on one hand, periodically arranged one after another in order to form an incremental track, whereby by scanning the measurement graduation with the sensor 5, the relative position (change of the position) of the sensor 5 relative to the base body G can be simply determined. On the other hand, by a suitable irregular distribution of the north and south poles in the measuring direction M, a specific code can be defined which would provide an absolute position measurement.

The first sections 1 of the magnetic base body G have a first thickness D which defines the dimension of the base body G in the direction transverse to the measuring direction M along the magnetic anisotropy axis A. The second sections 2 of the magnetic body G, which are respectively arranged between two first sections 1 are formed by through-openings 22, 22' extending along the anisotropy axis A. A portion of the openings 22' adjoins a material region 21 of the base body G having a thickness d smaller than the thickness D of the first sections 1.

The second sections 2 of the magnetic base body G form, in comparison with first sections 1, magnetically weak regions (weak points). This is because at a uniform magnetization of the base body G with a homogeneous outer magnetic field, which is oriented perpendicular to the measuring direction M (along the anisotropy axis A), a stronger magnetization is produced in the first sections 1 of the base body G than in the second sections 2. This is because the second sections 2 are formed either exclusively of the through-bores 22, in which case they are not suitable for producing a permanent magnetic field, or of through-openings 22' in combination with respective material regions 21 which have a smaller thickness d, in which case a smaller permanent magnetic field is produced in the second sections 2. Thus, the second sections 2, which are formed by the magnetically weak regions, can be magnetized with a comparatively weaker magnetic field than the first sections 1 of the base body G.

When the base body G is magnetized in a homogeneous outer field, the field lines of which extend along the anisotropy axis A transverse to the measuring direction M, a magnetic field M' is induced in the first sections 1 of the base body G and the field lines of which likewise extend along anisotropy axis. Because of the magnetically weak regions, which are arranged adjacent to the first sections of the base body G, the field lines, which are produced in the first sections 1 of the magnetic base body G, are not closed over the reflux that runs completely outside of the base body G. Rather, the corresponding magnetic reflux runs through the second sections 2 formed as weak regions. Thereby, the magnetization in the second sections 2 of the base body G has an opposite direction as compared with that in the first sections 1 of the base body G. This again leads to the already described above, formation of north and south poles N and S on the upper surface 01 of the base body G. These north and south poles N and S can be scanned by corresponding sensors 5, e.g., Hall-sensors, for effecting a position measurement.

The particularity of the base body G of the magnetic measurement graduation, which is shown in FIG. 1, consists in that at magnetization of this one-piece base body G in a homogeneous outer magnetic field, its field lines extend along a uniform direction in which the base body G is magnetized and at which the sections with a first magnetization direction (which corresponds to that of the outer magnetic field) and the sections with a second, opposite magnetization direction alternate. This is because after the switching-off of the outer magnetic field or after the removal of the base body from the influence of the outer magnetic field, the magnetization direction in the second sections of the base body, which are formed as weak regions, is defined by the magnetic reflux of the magnetization of the first sections.

When the magnetic base body G is produced by injection-molding, its magnetization can be effected in an outer magnetic field produced, e.g., by a device for producing a magnetic field and which is incorporated in a respective injection-molding machine.

For a predetermined guidance of the magnetic flux on a surface 02 of the magnetic body 1 remote from the sensor 5, there is provided a flux guiding metal sheet 3 thereon which contains preferably iron or nickel. The metal sheet 3 can be attached to the base body G with a bonding mass containing an epoxy resin which simultaneously serves as a filler for filling the recesses AU of the base body G and formed in its second sections. The filling or bonding mass thus performs a double function, namely, stabilization of the base body, by filling recesses formed in its second sections 2, on one hand, and connecting the flux guiding metal sheet 3 to the base body G, on the other hand. For connection with the filling and bonding mass, the base body can be provided with special bonding grooves.

Another embodiment of a linear position measuring system is shown in FIG. 2.

The system, which is shown in FIG. 2, differs from that of FIG. 1 in that the base body G of the measurement graduation is not provided with any flux guiding metal sheet, and in that each of the opposite, with respect to the anisotropy axis A, surfaces 01,02 of the base body G is associated with a respective sensor 5,5[1] displaceable along the respective surface 01,02 in the measuring direction M. The sensors, 5,5[1] can be connected in parallel or in series.

A further difference consists in that in the base body G, which is shown in FIG. 2, the second sections 2, which form the magnetically weak region, are formed by regions with a smaller material width (thickness at along the anisotropy axis A transverse to the measuring direction M), rather than by through-openings as in the embodiment of FIG. 1.

By changing the geometry of weak regions 23, 24 which form the second sections 2 of the base body G, the field configuration in the region of the sensors 5,5[1] which serve for scanning the base body G, can be purposely influenced. In FIG. 2, on one hand, weak regions 23 are shown the surface of which immediately adjoins the surface 01 of the adjacent first sections 1 of the base body G and, on the other hand, weak regions 24 are shown which are offset stepwise with respect to both opposite surfaces 01, 02 of the base body G.

Also, with a base body G of a magnetic measurement graduation which is shown in FIG. 2, after the magnetization of the base body G in a homogeneous outer magnetic field (i.e., after the removal of the base body G from the magnetic field), the direction of the magnetization in the second sections 2 of the base body G, which are formed by the magnetically weak regions 23, 24, is determined by the magnetic reflux of the magnetization of the first, thicker sections 1 of the base body G i.e., after the removal of the base body G from the homogeneous outer magnetic field, which is used for its magnetization, or after turning this magnetic field off, the magnetization in the weak regions is reversed and runs in a direction opposite to the direction of the magnetization, of the thicker first sections 1 of the base body G, which was induced by the outer magnetic field.

When the magnetic weak regions have a smaller critical temperature (irregular temperature or Curie temperature in case of ferromagnetism) than the first sections of the base body, then the base body can be heated, in order to facilitate the magnetization, to a temperature somewhat below the critical temperature of the weak regions. At such temperatures, the magnetism in the weak regions is particularly unstable.

In addition, the magnetizing process can be facilitated by application of an outer magnetic field acting, with reference to the anisotropy axis of the base body G, in a direction opposite the direction of the previously applied outer homogeneous magnetic field and which is noticeably weaker than the homogeneous magnetic field. The second magnetic field is applied in order to facilitate the magnetizing process of the weak regions of the base body. However, it should not be strong enough that it would alter the direction of the magnetization in the first sections of the base body. It is important that the weak regions of the base body have a smaller coercive field than the first section of the base body, i.e., the second sections of the base body (weak regions) could be magnetized with comparatively weaker magnetic field than the first sections of the base body.

In comparison with the embodiment of the base body G shown in FIG. 1, the web-like structure of the weak regions 23, 24 in the base body shown in FIG. 2 leads, on one hand, to a better stabilization of the base body and, on the other hand, to amplification and stabilization of local magnetic fields in the weak regions.

Magnetic measuring graduations, which are shown in FIGS. 1 and 2 for use in linear measuring systems (linear position measuring systems) can be use correspondingly in angle measuring system or shaft encoders. Embodiments of measuring graduations for angle measuring systems or shaft encoders are shown in FIGS. 3a, 3b, 4a, 4b. There, the first magnetic sections 1 and the second magnetic sections in form of weakness regions are arranged along a circle one after another on a disc-shaped base body G.

Figure 3A:
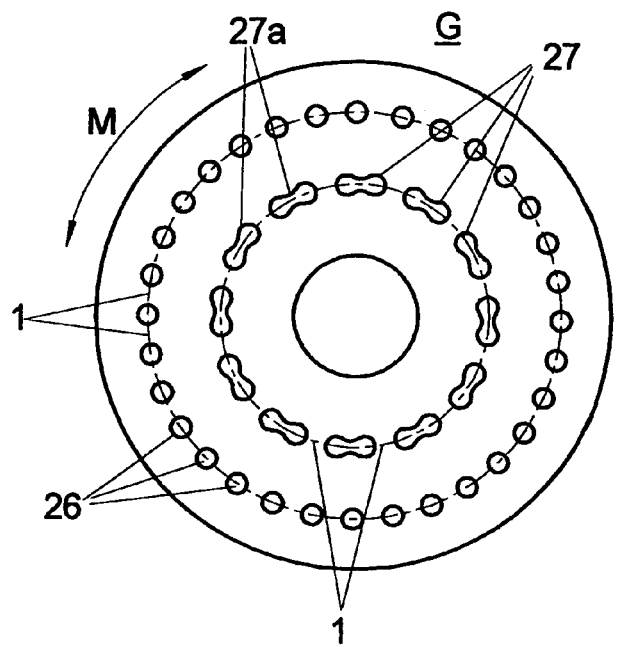
FIG. 3a a plan view of a magnetic measurement graduation for an angle measuring system.
Figure 3B:
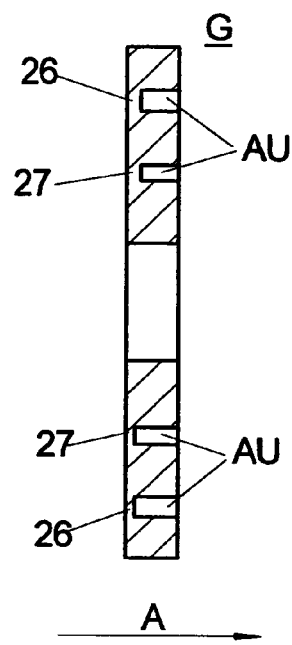

In the emobidument of the measuring graduation shown in FIGS. 3a–3b, a plurality of magnetic weak regions 26 are arranged one after another on a circle in a spaced relationship relative to each other. The circular regions 26 have a small thickness along the magnetic anisotropy axis. In respective locations, the base body G has recesses AV to provide for the small thickness of the respective regions 26.

Instead of rotationally symmetrical (circular) weak regions 26, other profiles of the weak regions can be used. E.g., the weak regions can be formed as elongate openings extending along the measuring direction M and arranged one after another in this direction, with the first sections 1 of the base body being located therebetween.

In the embodiment shown in FIGS. 3a–3b, there are also shown arranged along a circle, weak regions 27 formed by elongate recesses AV with a contraction 27a in their middle regions. The weak regions 27 have a somewhat bone shape. Generally, a concrete bone shape, as against other shapes of the weak regions with a contraction, is preferred, in particular for manufacturing reasons. With reference to the measuring principles, the bone-shaped weak regions 27 can be replaced with other weak regions having a contraction 27a in the middle regions and the edges of which are not rounded but rather cornered.

The crucial thing is that (because of the contractions 27a in the middle, viewed in the measuring direction M, region of the weak regions 27) a particularly steep field gradient exist in the transitional regions between the first sections 1 of the base body b and the adjacent weak regions 27 of the base body G. The resulting magnetic field is characterized by a sharp transition between the first sections and the weak regions and by a high stability in the weak regions themselves. This also leads to concentration of the flux density in the region of the contractions 27a. Circular weak regions 26 result in essentially sinusoidal course of the magnetic field along the measuring direction M.

Figure 4A:
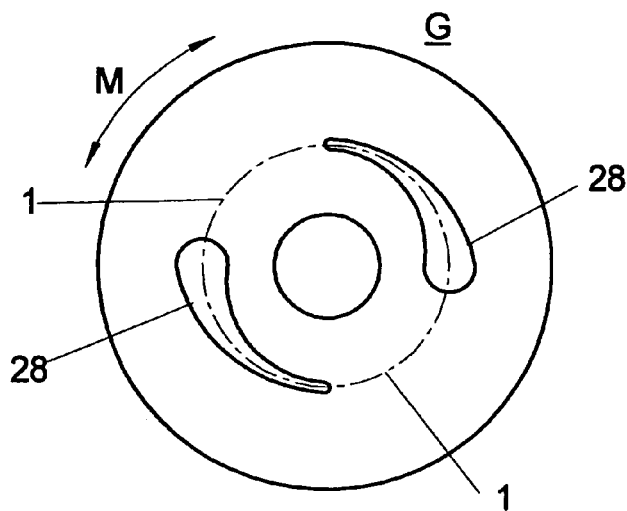
FIG. 4a a plan view of another embodiment of a magnetic measurement graduation for an angle measurement system.
Figure 4B:
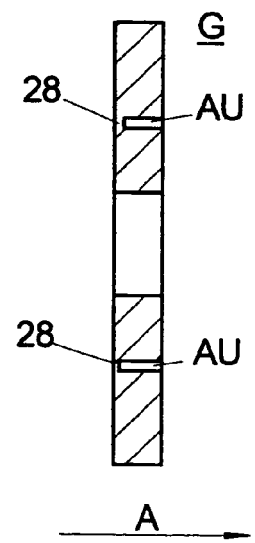
FIG. 4b a cross-sectional view of the measurement graduation shown in FIG. 4b.

In the embodiment of a measuring graduation shown in FIGS. 4a–4b, the weak regions 28, which are provided between first sections 1 of the base body G, have a shape of a tear drop, i.e., they narrow or widen continuously along the measuring direction M from one end to another rounded end in a plane extending perpendicular to the magnetic anisotropy axis. Here, a defined, uniform field gradients are produced in the transitional regions between the first sections 1 and weak regions 28, e.g., with a tooth saw-like magnetization along the measuring direction.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A measuring graduation for position measuring systems, comprising a permanently magnetizable base body extending in a measuring direction, the base body having first and second sections alternatingly arranged one after another in the measuring direction and having, respectively, first and second magnetization directions, a position information being generated by a sensor displaceable relative to the base body in the measuring direction for scanning same, wherein the second sections are formed by magnetically weak regions, and wherein the second magnetization direction of the second sections is defined by a magnetic reflux of the first magnetization direction of adjacent first sections.

2. A measuring graduation according to claim 1, wherein the second section of the base body are so arranged relative to the first section of the base body that the magnetic reflux, which is produced by a magnetic field generated by the magnetization of the first sections of the base body runs through the second sections of the base body.

3. A measuring graduation according to claim 1, wherein the second sections of the base body have predominant portions thereof surrounded, in a direction transverse to the second magnetization direction thereof, by respective regions of the first sections of the base body.

4. A measuring graduation according to claim 1, wherein the second magnetization direction of the second sections of the base body is substantially opposite the first magnetization direction of the first sections of the base body.

5. A measuring graduation according to claim 1, wherein the second sections of the base body have a smaller coercive field strength than the first sections of the base body.

6. A measuring graduation according to claim 1, wherein the second sections of the base body have a smaller coercive field strength than the first sections of the base body, at least upon being heated to a predetermined temperature.

7. A measuring graduation according to claim 1, wherein the second sections of the base body have a smaller critical temperature, with respect to magnetism, than the first sections of the base body.

8. A measuring graduation according to claim 1, wherein the magnetically weak regions are defined by recesses formed in the base body.

9. A measuring graduation according to claim 8, wherein the recesses form regions with a reduced material thickness along the second magnetization direction.

10. A measuring graduation according to claim 8, wherein the recesses are filled with a filling mass.

11. A measuring graduation according to claim 1, wherein the weak regions are formed symmetrical in such a way that viewed in the measuring direction, a symmetrical field distribution is provided on both sides of the base member.

12. A measuring graduation according to claim 1, wherein the base body is formed as a one-piece part.

13. A measuring graduation according to claim 1, wherein the base body contains strontium ferrite.

14. A measuring graduation according to claim 1, wherein a flux guiding element is provided on one side of the base body.

15. A measuring graduation according to claim 14, wherein the flux guiding element is formed of a sheet metal containing at least one of iron and nickel.

16. A measuring graduation according to claim 14, wherein the magnetically weak regions are defined by recesses which are formed in the base body and which are filled with a filling mass, and wherein the filling mass serves as a glue for attaching the flux guiding element to the base body.

17. A measuring graduation according to claim 1, wherein the base body forms a graduation support for a linear graduation.

18. A measuring graduation according to claim 1, wherein the base body forms a graduation support for an angle graduation.

19. A measuring graduation for position measuring systems, comprising a base body formed of a permanently magnetizable material and extending in a measuring direction, the base body having first and second sections alternatingly arranged one after another in the measuring direction and having, respectively, first and second magnetization directions, a position information being generated by a sensor displaceable relative to the base body in the measuring direction for scanning same, wherein the second sections are formed by magnetically weak regions, and wherein the second magnetization direction of the second sections is defined by the first magnetization direction of adjacent first sections wherein the weak regions, viewed in the measuring direction, have a contraction in a middle region thereof.

20. A measuring graduation according to claim 19, wherein the weak regions are bone-shaped.

21. A measuring graduation for position measuring systems, comprising a base body formed of a permanently magnetizable material and extending in a measuring direction, the base body having first and second sections alternatingly arranged one after another in the measuring direction and having, respectively, first and second magnetization directions, a position information being generated by a sensor displaceable relative to the base body in the measuring direction for scanning same, wherein the second sections are formed by magnetically weak regions, and wherein the second magnetization direction of the second sections is defined by the first magnetization direction of adjacent first sections wherein weak regions are one of continuously narrow and widen from one end to another end.

22. A measuring graduation according to claim 21, wherein the weak regions have a tear drop shape.

23. A measuring graduation according to claim 22, wherein the base body is formed by injection-molding.

24. A position measuring system, comprising:
a measuring graduation having a permanently magnetized base body extending in a measuring direction, the base body having first and second sections alternating arranged one after another in the measuring direction and having, respectively, first and second magnetization directions, with the second sections being formed by magnetically weak regions and with the second magnetization direction of the second sections being defined by a magnetic reflux of the first magnetization direction of adjacent first sections; and at least one sensor displaceable along a longitudinal side of the base body in the measuring direction for scanning same for generating position information.

25. A position measuring system according to claim 24, comprising two sensors displaceable along opposite longitudinal side of the base body in the measuring direction.

* * * * *